United States Patent [19]

Kingsford

[11] Patent Number: 4,799,717
[45] Date of Patent: Jan. 24, 1989

[54] TORQUE LOCK FITTING ARRANGEMENT

[75] Inventor: Kenji A. Kingsford, Devore, Calif.

[73] Assignee: Mace Corporation, Upland, Calif.

[21] Appl. No.: 92,163

[22] Filed: Sep. 2, 1987

[51] Int. Cl.$^4$ ............................................. F16L 21/06
[52] U.S. Cl. .................................. 285/341; 285/382.7
[58] Field of Search ...................... 285/382.7, 341, 343, 285/249, 348

[56] References Cited

U.S. PATENT DOCUMENTS

| | | | |
|---|---|---|---|
| 2,333,470 | 11/1943 | Cowles | 285/382.7 X |
| 2,693,375 | 11/1954 | Wurzburger | 285/382.7 X |
| 2,779,610 | 1/1957 | Risley | 285/348 X |
| 2,943,871 | 7/1960 | St. Clair | 285/382.7 X |
| 3,215,457 | 11/1965 | Teeters | 285/382.7 X |
| 3,501,177 | 3/1970 | Jacobs | 285/382.7 X |
| 4,298,222 | 11/1981 | Davies | 285/382.7 X |

OTHER PUBLICATIONS

Galtec Tube Fittings Brochure Dated 1982.
Nacom Industries, Inc. Brochure Re Teflon Fittings.
Fluorocarbon Teflon Fluid Handling Systems Brochure Dtd 1973.
Fluorocarbon Injection Molded Teflon PFA Fittings Brochure Dtd 1983.

Primary Examiner—Thomas F. Callaghan
Attorney, Agent, or Firm—Flynn, Thiel, Boutell & Tanis

[57] ABSTRACT

A fitting having a collar defining a bore which accommodates a plastic tube. The collar defines a tapered seat on the end thereof. A tapered plastic ferrule surrounds the tube and cooperates with the tapered seat for compressing the ferrule into sealing engagement with the tube. The ferrule has an axial end face adapted to abut a deformable plastic gripper sleeve which surrounds the tube, the gripper being surrounded by a nut which threads over the collar. The gripper is disposed in a tapered bore in the nut. The gripper has a tapered exterior surface which extends at an angle which is slightly greater than the angle of the tapered bore. When the nut is threaded onto the collar, the differential taper causes an axial torque to be imposed on the gripper so as to radially distort the gripper into gripping engagement with the tube. The gripper has an axial end surface which, when nondistorted, is slightly sloped axially away from the ferrule as it projects radially outwardly. This end surface is distorted and flattened upon tightening of the nut on the collar so as to abut the end face of the ferrule.

8 Claims, 1 Drawing Sheet

TORQUE LOCK FITTING ARRANGEMENT

FIELD OF THE INVENTION

This invention relates to an improved fitting arrangement specifically for sealingly coupling a plastic fitting to a length of plastic tube by means of a compressive engagement.

BACKGROUND OF THE INVENTION

Fitting arrangements for effecting a compressive sealed engagement to the end of a nonthreaded tube, particularly when the tube is constructed of metal or glass, have conventionally utilized a collar or nut disposed in surrounding relationship to the tube, with a tapered compression sleeve (conventionally referred to as a ferrule) cooperating therebetween to effect the desired sealed relationship around the tube. Similar such fitting arrangements have also been adapted for use with plastic tubes, although many such fitting arrangements have provided less than optimum results in view of the fact that plastic tube more readily deforms. Further, in many of the known fitting arrangements, once the fitting is disassembled and then reassembled, it has been observed that a proper compressive seal can no longer be obtained, and hence some leakage has been observed.

Another problem with the use of such fitting arrangements, particularly when used in conjunction with plastic tube, is the inability to securely lock the fitting in place inasmuch as plastic tube is very slippery and hence the fitting tends to slide axially therealong. To overcome this problem, one known fitting arrangement provides a separate gripper sleeve which is also disposed within the nut so as to be compressed against the tube, the gripper sleeve being axially split so as to be radially compressible and being provided with radially inward projections which effect localized deformation and hence gripping of the plastic tube.

The fitting arrangement employing a separate gripper sleeve, as described above, has been extensively commercially utilized by many manufacturers. In operation of this fitting, the gripper sleeve at one end has an exterior conical surface which is engaged with an opposed conical surface on the nut, and the gripper sleeve at its other end has an axial end face which abuts against an opposed axial end face on the ferrule. In theory, the ferrule is radially compressed by the tapered end of the fitting as the latter is relatively threaded axially into the nut, and the ferrule and nut in turn cooperate to axially compress and ultimately radially compress the gripper sleeve. In actuality, however, it has been observed that the gripper sleeve often affixes itself to the tube before it has moved forwardly into the nut a sufficient distance to permit the ferrule to be properly radially deformed into compressive sealing engagement with the tube. That is, the gripper sleeve tends to prematurely affix itself to the tube before the ferrule has been sufficiently radially compressed to permit sealing engagement with the tube, whereupon the gripper sleeve then interferes with and effectively prevents proper radial compression of the ferrule. Hence, a proper deformation of the tube by the ferrule, and thus creation of a proper seal, is not achieved. Fitting arrangements of this latter type have often exhibited leakage, and in fact a significant percentage of such fittings do exhibit leakage and often require replacement.

In an attempt to overcome the leakage problems associated with fitting arrangements of the above type, numerous variations have been made in the design of the gripper sleeve. For example, some fitting arrangements have constructed the gripper in the manner of a flexible collet. That is, the gripper sleeve is formed as a continuous ring having a plurality of circumferentially spaced slits, with alternate slits opening through one of the axial ends of the gripper sleeve, with the slits at their other end being closed. With such construction, however, it has been observed that proper sealing is still oftentimes difficult to achieve, and proper cooperative engagement of the gripper between the tube, nut and ferrule is not consistently achieved.

Accordingly, it is an object of this invention to provide an improved fitting arrangement constructed similar to the first aforementioned type, which fitting arrangement is capable of sealing aggressive fluids and gases throughout a wide temperature range without requiring special equipment or tube preparation.

More specifically, in the improved fitting arrangement of the present invention, the sleevelike gripping sleeve and ferrule axially cooperate with one another and within the threadedly engaged nut and fitting body. The ferrule, as is known, has a tapered outer surface which engages an opposed tapered inner surface on the fitting body, the taper on the ferrule being slightly less than the taper on the fitting body so that the leading edge of the ferrule is sealingly clamped against and into the wall of the tube. The gripping sleeve has an outer tapered surface surrounded by an inner tapered surface on the nut, with the taper on the gripper sleeve being slightly larger (such as by about 5°) than the taper on the nut. The leading end surface on the gripper sleeve, namely the end surface which opposes and abuttingly contacts the end surface on the ferrule, is dished or angled by an amount similar to the differential between the tapers on the nut and gripper sleeve. Tightening of the nut onto the fitting body causes the inner taper on the nut to react against the taper on the gripper sleeve, which thereby effects an axial torsional distortion of the gripper sleeve so that the teeth thereon are forced into the wall of the tube, and at the same time the dished end surface of the gripper sleeve assumes a substantially flat condition wherein it abuts the opposed flat end surface on the ferrule. This rotational biting of the gripper sleeve into the tube can be effected while requiring little tightening force of the nut onto the fitting body. At the same time, the gripper sleeve, due to the axial torque imposed thereon by the nut, acts as a spring and exerts pressure against the opposed end face of the ferrule so as to sealingly clamp the ferrule between the fitting body and the tube.

Other objects and purposes of the invention will be apparent to persons familiar with structures of this general type upon reading the following specification and inspecting the accompanying drawings.

Figure 1:
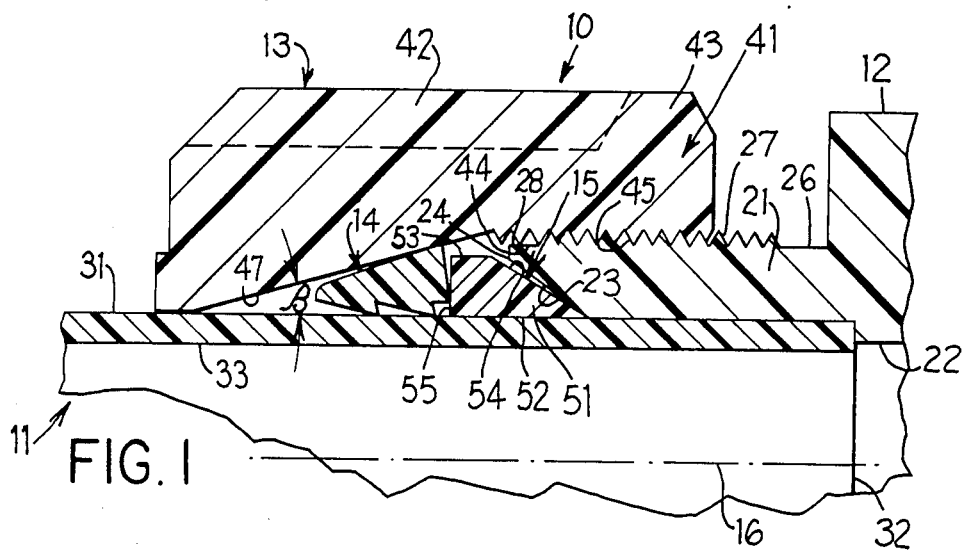
FIG. 1 is a fragmentary sectional view showing the fitting arrangement of the invention at a position of initial engagement, but prior to tightening.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
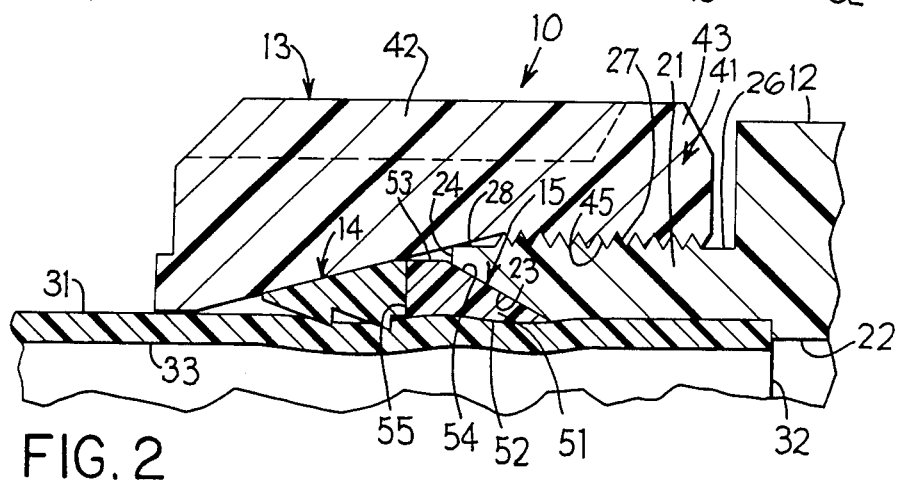
FIG. 2 is a view similar to FIG. 1 but showing the fitting arrangement after tightening.

Referring to the drawings, and specifically FIGS. 1 and 2, there is illustrated a fitting arrangement 10 which is adapted to be sealingly engaged with the free end of a nonthreaded tube 11, specifically a deformable tube such as a plastic tube. The fitting arrangement 10 includes a fitting 12 which cooperates with the end of the tube 11, a nut 13 which surrounds the tube and threadedly engages the end of the fitting 12, a gripper 14 which is carried by the nut so as to axially secure the arrangement to the end of the tube, and a ferrule 15 which is axially compressed by the nut to effect an annular sealing engagement with the tube 11 and the fitting 12. The basic parts of the fitting arrangement are annular and concentrically surround the tube 11 and its longitudinal axis 16.

The fitting 12 can be of any conventional type, such as a tee, a coupling, an adapter or an elbow.

The fitting 12, at the end thereof, has a collar or tubular portion 21 provided with a flow opening or bore 22 therethrough. This bore 22, at its outer end, connects with a flared seat 23 which is of a truncated conical configuration, whereby the seat 23 tapers radially outwardly as it projects axially outwardly from the bore 22. This flared seat 23 terminates in an end wall 24.

The collar 21 defines thereon an outer annular wall 26, the latter being externally threaded at 27 over a substantial extent thereof. The thread 27, however, does not project all the way to the end wall 24, but rather is spaced axially rearwardly therefrom by an exterior annular supporting wall 28, the latter being of substantially the same diameter as the wall 26. This annular supporting wall 28 normally has an axial extent in the range of about 0.05 to 0.06 inch, which axial length approximately equals the pitch of the thread 27.

The fitting 12 is constructed of a plastics material, preferably being molded from PFA (perfluoroalkoxy)-type or TFE-type "Teflon".

The plastic tubing 11, as is conventional, has a substantially cylindrical outer wall 31 which terminates in an end wall 32. The tubing has a bore 33 therethrough. The diameter of the outer wall 31 is generally sized so that the tubing will be a snug fit within the bore 22 of fitting 12.

The tubing 11 can be of any conventional plastic or similar material. However, the improved fitting arrangement 10 of this invention is particularly desirable for use when the tubing 11 is constructed of PFA-type or TFE-type Teflon.

The nut 13 is formed as a one-piece sleeve 41 which is also constructed of a plastics material, preferably being molded from either PFA or TFE Teflon. The sleeve 41 as illustrated has a plurality of axially extending ribs 42 provided in circumferentially spaced relationship therearound so as to define a gripping surface, and these ribs 42 terminate in an annular rib 43 which surrounds the sleeve member adjacent one end thereof. Preferably, however, the sleeve is provided with a hexagonal exterior configuration to permit tightening with a conventional wrench.

The sleeve 41 has a variable diameter bore extending axially therethrough which includes a bore 44 which is internally threaded at 45 over a majority of its length. The internal thread 45 is adapted to threadedly mate with the external thread 27 on the collar. The bore 44, at its inner end, communicates with a further cylindrical bore 47 which projects axially through the other end of the nut. This bore 47 is of a converging tapered (i.e., truncated conical) configuration as it projects outwardly through the other end of the sleeve. The slope of this bore 47 is rather small, such as approximately 15° in the illustrated embodiment.

The ferrule 15 is also of a plastics material, preferably molded of PFA or TFE Teflon. The ferrule is formed as a one-piece ring 51 having a bore 52 extending coaxially therethrough, which bore 52 equals or slightly exceeds the outer diameter 31 of the tube 11 so as to permit the latter to be slidably but snugly moved through the ferrule. The ferrule ring 51 has an outer annular wall 53, the latter being joined to the inner bore 52 by an annular tapered seat 54 which is of a truncated conical configuration. This tapered seat 54, where it intersects the inner bore 52, effectively defines a rather sharp point or corner. The other end of the ferrule ring 51 defines thereon a substantially planar end face 55 which is substantially perpendicular to the axis 16.

The tapered seat 54 is adapted to wedgingly cooperate with the flared seat 23 formed on the collar 21, and hence these seats may be of identical slope. In a preferred embodiment, however, the slope between these two seats is preferably slightly different, for example the flared seat 23 has a preferred slope of about 33° and the tapered seat 54 has a preferred slope of about 30° relative to the longitudinal axis 16.

Figure 3:
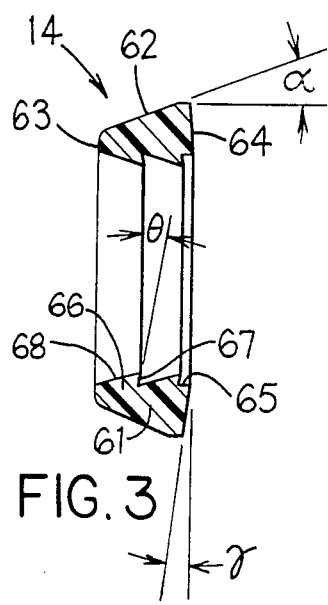
FIG. 3 is an axial sectional view of the gripper sleeve.
Figure 4:
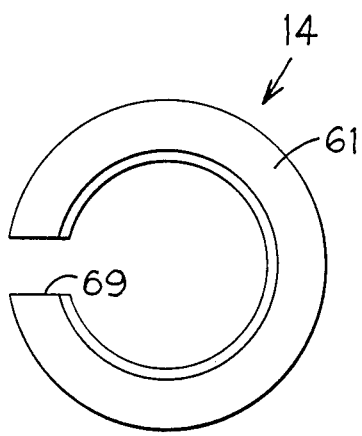
FIG. 4 is an end view of the gripper sleeve.

Considering now the gripper 14 (FIGS. 3 and 4), it is also constructed as a one-piece ring 61 having an outer annular wall 62 which slopes radially outwardly as it projects axially from the outer axial end face 63 toward the inner axial end face 64. This outer annular wall 62 defines a truncated conical configuration. An opening or bore 65 of uniform diameter extends axially through the ring 61, which bore 65 is significantly larger than the diameter 31 of the tube 11 when the gripper is in a nondeformed condition. The gripper has at least one, and preferably two or more, annular teeth or ribs (i.e., gripping ribs) 66 which are formed integrally with the ring 61 and project radially inwardly in surrounding relationship to the bore 65. These ribs 66 are preferably slightly axially spaced from one another, and project radially inwardly so as to define a diameter therein which approximately equals the external diameter of the tube 11 when the gripper 14 is in a nondeformed condition These gripping ribs 66 preferably create a one-way gripping function since, as illustrated by FIG. 3, each rib terminates in a transversely extending rear face 67, whereas the front face 68 is of a general outwardly projecting slope since this facilitates the sliding of the gripper sleeve onto the free end of the tube 11, but effectively prevents reverse movement when the gripping ribs penetrate the tube. The one-piece ring 61 defining the gripper 14 is also preferably axially split by a single slit or slot 69 which extends throughout the axial length of the gripper so as to facilitate radial deformation thereof.

The slope of the exterior annular wall 62 of the gripper 14 preferably extends at an angle of inclination α which is greater than the angle of inclination $\beta$ defined by the tapered interior wall 47 on the nut 13. In fact, this angle $\alpha$ exceeds the angle $\beta$ by a differential in the range of about 4° to about 10°, with this differential preferably being in the range of about 5° to about 7°. In the illustrated embodiment, the angle $\alpha$ is about 20°, and the slope or angle $\beta$ is about 15°.

The end wall 64 of the gripper 14 is also provided with a slightly dished or conical configuration in that this wall 64 is tapered or dished at a small angle $\gamma$ relative to the perpendicular as the wall projects radially outwardly. This slope $\gamma$ is directed axially toward the other end of the gripper, and the angularity of this slope $\gamma$ is preferably equal to the difference in angularity between the angles $\alpha$ and $\beta$. Hence, the slope $\gamma$ is preferably in the range of about 5° to about 7°.

The transverse face 67 of the rib 66 is also preferably provided with a back rake angle $\theta$, which angle slopes toward the end face 63 as the angle projects outwardly from the radially inner tip of the rib. This angle $\theta$ preferably exceeds the angle $\gamma$ and, in the illustrated embodiment, is about 10°.

The gripper 14 is also formed of a plastics material, preferably being molded of a liquid crystal polymer (LCP) so as to have resistance to media degradation while offering high strength and excellent temperature capabilities. As alternate materials, the gripper may also be constructed of PEK (polyetherketone) or PEEK (polyetheretherketone).

OPERATION

The assembly of the fitting arrangement 10, and its cooperation with the tube 11, will be briefly described to ensure a complete understanding thereof.

The fitting arrangement 10 is initially assembled by inserting the nut 13, gripper 14 and ferrule 15 over the free end of the tube 11 and thereafter fitting the free end of the tube 11 into the bore 22 of the fitting 12. Thereafter the nut 13 is pushed axially toward the fitting 12, and is then relatively rotated so as to effect threading engagement of the nut onto the fitting 12. The initial threading of the nut onto the fitting merely results in proper positioning of the gripper and ferrule, substantially as illustrated by FIG. 1. This condition, as illustrated by FIG. 1, has not yet resulted in any significant radial compression of either the gripper 14 or the ferrule 15.

Continued threading of the nut 13 onto the fitting 12, however, now causes the tapered wall 47 to wedgingly react against the outer tapered wall 62 of the gripper 14 in the vicinity of the large diameter end thereof due to the differential taper between these opposed walls. The nut hence applies a radial compression force against the gripper in the vicinity of the large diameter end thereof, and in effect causes an axial moment or torque to be applied to the gripper 14, which moment is in a clockwise direction as appearing in FIGS. 1 and 2. This causes the gripper to rotate inwardly toward the tube 11 so that the rightwardmost tooth or rib 66 begins to bite into the tube wall. The torsion moment imposed on the gripper 14 also causes the end wall 64 to dish in and effectively become flat so that it then substantially abuts against the opposed flat end wall 55 on the ferrule 15. This torsional moment or rotation of the gripper 14 results in the tapered wall 62 thereof substantially conforming to the angularity of the internal tapered wall 47 on the nut 13 substantially as illustrated by FIG. 2, at the same time the teeth 66 effectively grip the tube wall, and the end face 64 has been moved into solid abutting contact with the opposed end wall 55 on the ferrule. This tightening of the nut effectively causes the gripper 14, due to its being constructed of a high strength plastic material, acting like a spring in that it then exerts pressure against the end face 55 of the ferrule in a manner similar to a spring so that the leading or tapered end of the ferrule 15 is wedgingly clamped between the tapered seat 23 on the fitting body and the external wall of the tube, whereby the tapered or tip end of the ferrule effectively causes local deformation of the outer wall of the tube 11 so as to create an effective seal between the tube 11 and the fitting body 12.

Due to the fact that the gripping ribs 66 have a back rake angle of about 10° defined by the faces 67, when the gripper 14 is torsionally rotated through an angle of 5° due to the initial angular difference between the walls 47 and 62, the back rake angle on the rib surfaces 67 is still about 5°, and hence this is still highly effective in maintaining proper engagement of the gripper with the tube.

With the arrangement of the present invention, any relaxation in the tightness of the overall arrangement due to material cold flow or thermal cycling is substantially self-compensating due to the fact that the torsionally distorted gripper 14 continues to effectively act as a spring so as to maintain a proper sealed engagement of the ferrule 15 between the fitting body 12 and tube 11 while the gripper itself remains in proper engagement with the internal tapered bore 47 of the nut.

A highly advantageous feature of the fitting arrangement of this invention is the fact that this arrangement initially allows the teeth of the gripper to bite into the tube with very little tightening force, whereby the unit is hence relatively insensitive to the amount of tightening, and will function properly whether tightened by hand or by use of tools.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fitting arrangement adapted to be sealingly joined to the end of a plastic tubing, the fitting arrangement including a plastic fitting having a flow passage therethrough, the fitting having a tubular portion through which said passage extends and which terminates in a bore for closely accommodating the free end of the plastic tubing, the tubular portion being externally threaded, the tubular portion adjacent the free end thereof being provided with an annular flared seat of frustoconical configuration which flares axially and radially outwardly from the end of the bore so as to terminate at the free end of the tubular portion, a one-piece wedge-shaped plastic ferrule disposed in snug surrounding relationship to the plastic tubing and having an exterior annular wedge surface which is of a frustoconical configuration and is adapted to wedgingly contact the flared seat on the tubular portion, the ferrule having an end face which is directed axially away from the fitting and which extends substantially perpendicularly relative to the axis of said plastic tubing, a one-piece plastic gripping sleeve positioned in close surrounding relationship to the plastic tubing and having one axial end surface thereof adapted to abuttingly engage the axial end face of the ferrule, the gripping sleeve having a frustoconical exterior surface which extends axially away from said one end surface in converging relation relative to said plastic tubing, the gripping sleeve being radially deformable and having axially-spaced radially inwardly extending projections adapted to grippingly deform the elastic tubing to axially secure the gripping sleeve relative thereto, and an annular one-piece nut disposed in concentric surrounding relationship to the gripping sleeve but being rotatable relative thereto, the nut having an internally threaded first bore opening axially inwardly from one end thereof so that the nut can be externally telescoped over and threadedly engaged with the tubular portion to effect axial compression of the gripping sleeve and ferrule therebetween, the nut also having a tapered second bore which coaxially communicates with the threaded bore and extends therefrom axially through the other end of the nut, said second bore converging as it projects toward said other end of the nut, comprising the improvement wherein:

said frustoconical exterior surface on said gripping sleeve being defined by a first angle of inclination relative to the axis of said plastic tubing, said tapered second bore in said nut being defined by a second angle of inclination relative to said axis, said first angle of inclination being greater than said second angle of inclination so as to define a predetermined differential angle therebetween, said differential angle being in the range of about 4° to about 10°, and said one axial end surface of said gripping sleeve being sloped at a small angle relative to a plane perpendicular to the tubing axis as said one end surface projects radially outwardly, said one end surface being sloped axially toward said other end of said gripping sleeve as it projects radially outwardly, the small angle defining the slope of said one end surface being substantially equal to said differential angle, whereby said one end face on said ferrule and said one end surface on said gripping sleeve project radially outwardly in diverging relationship relative to one another when the gripping sleeve is in a radially nondeformed condition, said gripping sleeve being radially inwardly deformed so that the projections thereon grip the plastic tubing when the nut is threaded onto the externally threaded tubular portion and also being axially torsionally distorted due to said differential angle so that said one end surface of said gripping sleeve distorts and becomes flat so as to abut against the opposed end face of said ferrule.

2. A fitting arrangement according to claim 1, wherein said first angle of inclination is about 20°, and wherein said second angle of inclination is about 15°.

3. A fitting arrangement according to claim 1, wherein each said radially inwardly extending projection on said gripping sleeve has a gripping face which is directed generally toward the end face of said ferrule, said gripping face being sloped at an angle relative to the perpendicular plane in a direction axially away from the end face of the ferrule as the gripping face projects radially outwardly, said last-mentioned angle being greater than said differential angle.

4. A fitting arrangement according to claim 1, wherein said gripping sleeve has a single slit which extends completely through both the axial and radial extent of the gripping sleeve to permit radial deformation thereof, said gripping sleeve being constructed of a plastics material which resists media degradation and offers high strength and excellent temperature capabilities, such as a liquid crystal polymer.

5. A fitting arrangement according to claim 4, wherein said differential angle is in the range of about 5° to about 7°.

6. A fitting arrangement according to claim 1, wherein said differential angle is in the range of about 5° to about 7°.

7. A fitting arrangement according to claim 2, wherein the gripping sleeve has a single slit which extends completely through both the axial and radial extent thereof, said projections including a pair of axially-spaced ribs which extend circumferentially around said gripping sleeve and project radially inwardly thereof, said ribs at their radially inner free ends defining a diameter which approximately equals the diameter of the plastic tube when the gripping sleeve is in a nondeformed condition.

8. A fitting arrangement according claim 7, wherein each said rib on said gripping sleeve has a gripping face which is directed generally toward the end face of said ferrule, said gripping face being sloped at an angle relative to the perpendicular plane in a direction axially toward the end face of the ferrule as the gripping face projects radially inwardly towards its free end, said last-mentioned angle being greater than said differential angle.

* * * * *

UNITED STATES PATENT AND TRADEMARK OFFICE
CERTIFICATE OF CORRECTION

PATENT NO. : 4,799,717
DATED : January 24, 1989
INVENTOR(S) : Kenji A. KINGSFORD It is certified that error appears in the above-identified patent and that said Letters Patent is hereby corrected as shown below:

Column 7, line 8; change "elastic" to ---plastic---.
Column 8, line 38; change "tube" to ---tubing---.

Signed and Sealed this

Sixth Day of February, 1990

*Attest:*

JEFFREY M. SAMUELS

*Attesting Officer*  *Acting Commissioner of Patents and Trademarks*